United States Patent Office 3,600,460
Patented Aug. 17, 1971

3,600,460
THERMOPLASTIC REACTION PRODUCT OF A LINEAR SATURATED POLYESTER AND A POLYALKYLENE-DIOL
Ludwig Brinkmann and Helmut Fröhlich, Frankfurt am Main, Germany, assignors to Farbwerke Hoechst Aktiengesellschaft vormals Meister Lucius & Bruning, Frankfurt am Main, Germany
No Drawing. Filed Sept. 20, 1968, Ser. No. 761,315
Claims priority, application Germany, Oct. 7, 1967, P 17 20 723.7
Int. Cl. C08f 29/10; C08g 17/06, 39/10
U.S. Cl. 260—860
12 Claims

ABSTRACT OF THE DISCLOSURE

Thermoplastic moulding compositions comprising linear saturated polyesters and polyalkylene-diols which can be moulded into shaped articles having a high impact strength and bending strength.

---

The present invention relates to novel thermoplastic moulding compositions having improved properties.

It has been proposed to mould thermoplastic moulding compositions containing linear saturated polyesters of aromatic dicarboxylic acids and aliphatic or cycloaliphatic diols into shaped articles.

It has also been proposed to improve the dimensional stability of polyester moulding compositions by adding nucleating agents. The shaped articles obtained have, however, a moderate impact strength only.

The present invention provides thermoplastic polyester moulding compositions having excellent properties obtained by reacting (a) linear saturated polyesters of aromatic dicarboxylic acids and aliphatic or cycloaliphatic diols with
(b) polyalkylene-diols, and optionally subjecting the reaction products to an after condensation in the melt or in the solid state.

As polyalkylene-diol for the condensation with the polyester there is preferably used the hydrogenation product of polybutadiene-diol. The polybutadiene-diol may be made, for example, as disclosed in Journal of Polymer Science (1961), vol. XLIX, issue 152, pages S9 to S11. Hydrogenation of the polybutadiene-diol may be effected as described in Chemical Reactions of Polymers, published by John Wiley & Sons, Inc. (1964), pages 178 to 180. In general, the polyalkylene-diol is used in an amount of from 2 to 20% by weight, calculated on the total mixture, preferably 3 to 15% by weight. The starting polybutadiene-diol has a viscosity of from 20 to 100 poises, determined at 30 C. The polyalkylene-diol has a hydroxyl number corresponding to 18-90 milligrams of KOH per gram.

The linear saturated polyester of aromatic dicarboxylic acids and aliphatic or cycloaliphatic diols is preferably polyethylene glycol terephthalate, but other polyesters may be used, too, for example polycyclohexane-1,4-dimethylolterephthalate. There are also suitable modified polyethylene terephthalates which contain, in addition to terephthalic acid units, units of other aromatic or aliphatic dicarboxylic acids, for example units of naphthalene-2,6-dicarboxylic acid or adipic acid and/or in addition to ethylene glycol units, units of other aliphatic diols, for example of neopentyl glycol or butane-diol-1,4.

The polyesters have a reduced specific viscosity of from 0.6 to 2.0, preferably 0.9 to 1.6 dl./g., measured in a 1% solution in a 60:40 mixture of phenol and tetrachloroethane at 25° C.

Polyesters of lower reduced specific viscosity may alternatively be used and the viscosity raised within the preferred range by an after-condensation during the course of the mixing and ester interchange process.

The polyalkylene-diol units are preferably incorporated into the polyester with formation of block structures in the molten state. For this purpose the polyalkylene-diol is added to the polyester melt with the exclusion of air and moisture and the melt is thoroughly mixed. The ester interchange reaction is interrupted as soon as the desired viscosity is reached and the condensation product is transformed into granules by known methods.

In general, the condensation is continued until the polycondensation product has a reduced specific viscosity of from 1.0 to 1.7, preferably 1.1 to 1.6.

According to another mode of execution the homogeneous mixture of polyester and polyalkylene-diol is subjected to an after-condensation in the solid state at elevated temperature and under reduced pressure.

The condensation rate increases with the temperature and should be such that during the ester interchange reaction the granules do not sinter together.

To increase the speed of crystallization and the degree of crystallization the condensation of the polyesters with polyalkylene-diols in the melt or in the solid state may be effected in the presence of nucleating agents. Suitable nucleating agents are finely divided inorganic substances, optionally in combination with organic compounds. Alternatively, the nucleating agent may subsequently be applied to the block polycondensation product of high molecular weight, for example by subjecting to rotation the polyester granules and the nucleating agent for some time under nitrogen or under reduced pressure.

Polyester compositions containing, for example, talc, aluminum or an organic pigment have a high crystallization speed so that in the manufacture of shaped articles, especially by injection moulding, shaped articles are obtained having a high degree crystallinity which hardly changes at all at a temperature above the second order transition temperature. Consequently, the shaped articles produced in this manner from the high molecular weight linear saturated polyester have a high dimensional stability and do not shrink.

In order to keep the moisture uptake low during storage or processing the granulated condensation products with block structure may be coated with a hydrophobic substance, for example paraffin, wax or a silicon derivative. Coating may be effected, for example, by adding 0.4% by weight of a wax having a drop point of 56° C. and subjecting the mixture to rotation at 90° C. for 5 hours.

When the polyester compositions according to the invention are moulded at a temperature above the second order transition temperature—in general a temperature in the range of from 120 to 170° C. being chosen—shaped articles are obtained having a good dimensional stability and surprisingly an improved impact and bending strength. When reinforced polyester compositions are produced by combining the block copolyesters of the invention with known fillers or the compositions are blended with other polyesters, products having very valuable properties are obtained.

The following example serves to illustrate the invention but it is not intended to limit it thereto, the parts being by weight unless otherwise stated.

EXAMPLE 94.4 parts of finely divided polyethylene glycol terephthalate having a reduced specific viscosity of 0.865 dl./g. and 5.6 parts of polyalkylene-diol, prepared by hydrogenation of polybutadiene-diol having a viscosity of 50 poises at 30° C., were fused together at 270° C. under reduced pressure to give a homogeneous melt. After 1.5 hours the melt was cooled, the condensation product was comminuted and the reduced specific viscosity was determined. It was 0.740 dl./g., measured in a 1% solution in a 60:40 mixture of phenol and tetrachloroethane at 25° C. The product was then subjected to a condensation in the solid state for 13 hours at 240° C. under reduced pressure in a rotating apparatus whereby a polycondensation product was obtained having a reduced specific viscosity of 1.112 dl./g. The polycondensate was subjected to rotation for 2 hours under nitrogen at room temperature together with 0.2% by weight of China Clay Dinkie A as nucleating agent. At 270° C. sheets of dimensions 60 x 60 x 2 millimeters were injection moulded at a mould temperature of 150° C. and a moulding period of 15 seconds. The impact strength of the sheets was tested by a drop test in which the test sheets were exposed to impact stress by allowing a falling hammer sliding on low friction tracks to drop vertically from various heights on to the sheets clamped in a frame. The tip of the dropping hammer represented a hemisphere having a radius of 10 millimeters, its weight was 500 grams. As measurement for the impact strength there was taken the falling height $F_{20}$, that is the height in centimeters at which the impact energy was sufficient to break 20% of the sheets. 10 sheets were tested for each height.

The falling height $F_{20}$ of the injection moulded polycondensation product was 91 centimeters.

In a comparison experiment the impact strength of a polyester of terephthalic acid and ethylene glycol having a reduced specific viscosity of 1.40 dl./g., measured in a 1% solution in a 60:40 mixture of phenol and tetrachloroethane at 25° C. was tested. This product had a falling height $F_{20}$ of 50 centimeters.

What is claimed is:

1. A thermoplastic molding composition consisting essentially of the reaction product of (a) a linear saturated polyester of aromatic dicarboxylic acids and aliphatic or cycloaliphatic diols, said linear polyester having a reduced specific viscosity of 0.6 to 2.0 dl./g., measured in a 1% solution in a 60:40 mixture of phenol and tetrachloroethane at 25° C. and (b) from 2% to 20% by weight, based on the total weight of reaction product, of a hydrogenated polybutadiene diol having a hydroxyl number corresponding to 18 to 90 milligrams of KOH per gram.

2. A thermoplastic moulding composition as claimed in claim 1, wherein the polyester is polyethylene-glycol-terephthalate.

3. A thermoplastic moulding composition as claimed in claim 1, wherein the polyester is polycyclohexane-1,4-dimethylol terephthalate.

4. A thermoplastic moulding composition as claimed in claim 1, wherein the polyester contains, in addition to terephthalic acid units, units of other aromatic or aliphatic dicarboxylic acids.

5. A thermoplastic moulding composition as claimed in claim 1, wherein the polyester contains, in addition to terephthalic acid units, units of naphthalene-2,6-dicarboxylic acid.

6. A thermoplastic moulding composition as claimed in claim 1, wherein the polyester contains, in addition to terephthalic acid units, units of adipic acid.

7. A thermoplastic moulding composition as claimed in claim 1, wherein the polyester contains, in addition to ethylene glycol units, units of other aliphatic diols.

8. A thermoplastic moulding composition as claimed in claim 1, wherein the polyester contains, in addition to ethylene glycol units, units of neopentyl glycol.

9. A thermoplastic moulding composition as claimed in claim 1, wherein the polyester contains, in addition to ethylene glycol units, units of butane-diol-1,4.

10. Shaped articles made from the thermoplastic moulding compositions claimed in claim 1.

11. A method of making a thermoplastic molding composition having improved impact strength which comprises reacting (a) a linear saturated polyester of aromatic dicarboxylic acids and aliphatic or cycloaliphatic diols having a reduced specific viscosity of from 0.6 to 2.0 dl./g., measured in a 1% solution in a 60:40 mixture of phenol and tetrachloroethane at 25° C. and (b) from 2% to 20% by weight of said mixture of a hydrogenated polybutadiene diol having a hydroxyl number corresponding from 18 to 90 milligrams of KOH per gram to form a moldable product having improved impact strength.

12. A process according to claim 11 wherein the reaction product is subjected to an after-condensation in the solid state at an elevated temperature and reduced pressure to yield a moldable product having a reduced specific viscosity of 1.0 to 1.7 dl./g.

References Cited

UNITED STATES PATENTS

| | | | |
|---|---|---|---|
| 2,512,723 | 6/1950 | Lanham | 260—873 |
| 3,041,320 | 6/1962 | Chapin et al. | 260—873 |
| 3,313,777 | 4/1967 | Elam et al. | 260—860 |
| 3,439,063 | 4/1969 | Reilly | 260—873 |

WILLIAM H. SHORT, Primary Examiner

E. WOODBERRY, Assistant Examiner

U.S. Cl. X.R.

260—75, 873